United States Patent [19]

D'Atre et al.

[11] Patent Number: 4,761,600
[45] Date of Patent: Aug. 2, 1988

[54] DYNAMIC BRAKE CONTROL

[75] Inventors: John D. D'Atre; William P. Giewont, both of Earlysville, Va.

[73] Assignee: General Electric Company, Charlottesville, Va.

[21] Appl. No.: 22,936

[22] Filed: Mar. 6, 1987

[51] Int. Cl.⁴ ............................................. H02P 3/18
[52] U.S. Cl. .................................... 318/759; 318/758; 318/800; 318/762; 318/760; 187/119
[58] Field of Search .............. 318/759, 758, 762, 798, 318/799, 800, 801, 802, 803, 805, 807, 808, 809, 810, 811, 812; 187/29 R, 29 A

[56] References Cited

U.S. PATENT DOCUMENTS

| | | | |
|---|---|---|---|
| 4,039,914 | 8/1977 | Steigerwald et al. | 318/762 |
| 4,215,304 | 7/1980 | D'Atre et al. | 318/758 |
| 4,503,940 | 3/1985 | Watanabe | 318/759 |

Primary Examiner—William M. Shoop, Jr.
Assistant Examiner—B. K. Young
Attorney, Agent, or Firm—James H. Beusse

[57] ABSTRACT

A dynamic brake control system for an alternating current motor powered by a variable voltage, variable frequency inverter which regulates the speed of the motor. An AC to DC converter converts AC line power to DC power with the DC power being transferred to the inverter via a DC link. During electrical dynamic braking, the inverter functions to transfer power from the motor to the DC link. The torque available to the motor during braking is a function of the receptivity of the DC link. Link receptivity controlled by a resistance connected to the link in which the resistance is modulated at a frequency dependent upon the incoming AC line frequency at the converter. The modulation is binarily controlled so as to minimize ripple current on the DC link without the necessity of providing high frequency control of the modulating electronics.

5 Claims, 3 Drawing Sheets

DYNAMIC BRAKE CONTROL

FIELD OF THE INVENTION

This invention relates to electrical dynamic braking of an alternating current electric motor and, more particularly, to a braking control system and method for regulating dynamic brake current.

BACKGROUND OF THE INVENTION

Electric dynamic braking of alternating current (AC) induction and synchronous motors is one of several techniques used to reduce motor speed. During an electrical braking mode of operation, a motor acts as a generator to produce current and a corresponding retarding torque. In some systems, this regenerated current may be returned to the power source. When the power source is non-receptive to this regenerative current, the power may be dissipated in a dynamic braking resistance by conversion to thermal energy. Both regenerative and dynamic braking require current regulation in order to assure a smooth, constant torque braking action and to avoid motor instability.

In the past, dynamic braking control has been achieved by regulating the current magnitude through the braking resistance. In one form, as disclosed in U.S. Pat. No. 4,039,914, regulation has been accomplished by means of a chopper for generating variable width voltage pulses across the braking resistors. Typically, the same control circuit used for direct current (DC) rectification and chopping during the motoring mode operates during the braking mode to regulate current magnitude. A disadvantage of this control technique is that torque control necessary for smooth braking is limited by the available number of discrete resistance values which can be switched into the circuit in order to maintain steady current flow during braking since, as the motor slows, the regenerative power decreases.

One method which has been used to compensate for limited discrete resistance values employs high frequency switching regulators to modulate the resistance values. This method, while providing an effective means for smooth deceleration responsive changes in the resistive load, requires a high frequency switching circuit not otherwise needed in the motor propulsion system. It is desirable to achieve a smooth deceleration without the inclusion of such additional circuitry.

SUMMARY OF THE INVENTION

Among the several objects of the present invention may be noted the provision of a dynamic brake control for AC motors and an improved method of regulating dynamic braking resistances which overcome the disadvantages discussed above, as well as others, with respect to the prior art; the provision of such improved control and method in which pulse width modulation of a dynamic braking resistor is smoothly controlled without requiring high frequency switching; the provision of such improved dynamic braking control and method which is based on a binary time weighted application of a braking resistance and synchronization of binary weighting periods with base execution periods of a digitally controlled converter; the provision of such improved control and method in which the ripple voltage transients introduced during transitions in effective resistance are reduced to the order of steady state voltage changes; the provision of such improved control and method in which the same voltage control means utilized during motoring is utilized for dynamic braking; and the provision of such improved control and method which are applicable to both synchronous and induction motors. These as well as other objects of the present invention will be in part apparent and in part pointed out hereinafter.

In an illustrative embodiment, the invention is disclosed in the form of variable brake resistance for an induction motor powered by a variable voltage inverter. A converter is coupled to a source of AC potential for supplying a regulated DC voltage over a DC link to the inverter. A dynamic brake resistance is coupled to the DC link in parallel with a DC link capacitor. The resistance is serially connected to the link by an electrical switch, such as a silicon controlled rectifier (SCR). The resistance is varied by pulse width modulation of the SCR wherein the on/off time periods of the braking resistance are based upon the timing signals used during each base execution period to control converter voltage, thus providing a means for binary weighting of the braking resistance in order to develop a plurality of stepwise variable resistive loads. The desired level of dynamic braking is based on the application of the braking resistance during segments of each base execution period, the base execution periods each comprising 31 possible combinations of time segments for conduction through the resistance. Thus, by way of example, a 25.8% conduction time per cycle is achieved by conduction through the braking resistor during 8 of 31 time slots.

BRIEF DESCRIPTION OF THE DRAWINGS

FIGS. 4(A–D) illustrate one method for smoothing transitions between resistance values.

DETAILED DESCRIPTION OF THE PREFERRED EMBODIMENTS

Figure 1:
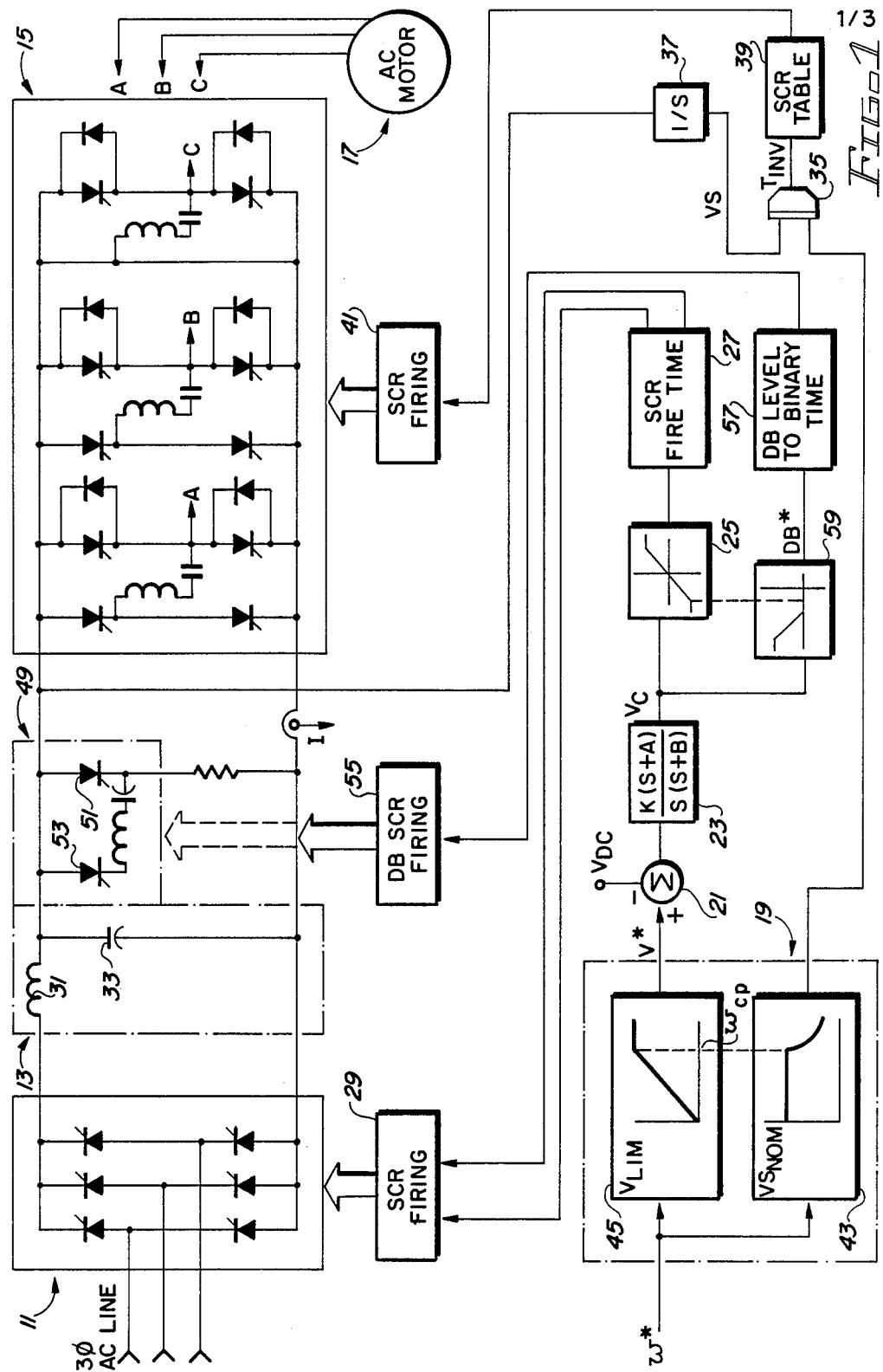
FIG. 1 is a schematic diagram partially in block form of one embodiment of a motor control system in which the improved dynamic braking control may be operated.

With reference to FIG. 1 there is illustrated an AC motor control system incorporating one form of the present invention. A 2-quadrant converter 11, which may comprise, by way of example, a combined full wave rectifier and chopper, converts 3-phase, 60 Hertz commercially available power into a controlled DC link voltage. Other various voltages and frequencies can serve as rectifier inputs. The illustrative converter 11 may comprise a full wave bridge rectifier of a type well known in the art employing a plurality of thyristors or other controlled switching devices, for regulating the DC voltage on a DC link 13. The regulated DC link voltage is coupled to an inverter 15 of a type well known in the art which switches at a controlled rate to convert ("invert") the DC voltage to an alternating current (AC) voltage at a regulated frequency. The inverter 15 is connected to supply AC excitation to motor 17.

For volts per Hertz operation, inverter 15 converts the regulated DC link voltage to a frequency proportional to the link voltage. Since the rotational speed of an AC motor is regulated by the frequency of the applied voltage, assuming sufficient applied power, the motor speed in a volts per Hertz control system can be regulated by controlling the DC link voltage. In the illustrative system, an external command W* calls for a selected motor speed. A processor 19, which may be a microcomputer, converts the speed command into a corresponding DC link voltage command V*. The processor 19 then provides gating signals to the switching devices in converter 11 to establish the desired voltage on DC link 13. The processor 19 is also programmed to provide gating signals to inverter 15 in such a manner as to provide AC excitation to motor 17 at a frequency having a predetermined correspondence to the DC link voltage, i.e., at such a rate as to maintain a constant volts per Hertz relationship.

The motor control system of FIG. 1, with the exception of the functions illustrated in block 19, is of a type known in the art and will not be described in great detail. The voltage command V* which sets the voltage on DC link 13 during motoring is summed with the DC link voltage VDC in summing junction 21 to produce an error signal representative of the difference therebetween. The resultant error signal is coupled to a proportional plus integral control block 23 for generating a signal representative of the desired gating/conduction times of the SCR's in converter 11. This latter signal is processed through a limiting amplifier 25 which limits its maximum and minimum values. The signal is then coupled to a cell fire table 27 which converts the limited signal to appropriate gating signals representative of firing times (phase angles) and conductive cells. The gating signals are coupled through a firing circuit 29 which distributes the signals to appropriate ones of the SCR's in converter 11.

The DC link 13 is essentially a low pass filter having a series inductor 31 and a shunt capacitor 33. The capacitor 33 acts as a current source for inverter 15 since the converter 11 cannot instantaneously react to hold the link voltage constant when the inverter fires.

The inverter 15 is a common three-phase inverter using twelve SCR's and has the ability to carry reverse current (regenerative current) from motor 17 to capacitor 33. The converter 11 is a two-quadrant converter and cannot handle reverse current.

The control of inverter 15 is based on a volts per Hertz relationship and is implemented in response to a volt-second command signal VS* from processor 19. Under normal operating conditions, i.e., in the constant torque motor operating region, the VS* signal is a constant. A variable relationship with speed exists in the constant horsepower region. The VS* signal is coupled to a comparator circuit 35 where it is compared to a VS feedback signal. The VS feedback signal is derived from the DC link voltage sampled at the inverter input and coupled through limit circuit 37. For a commanded speed W* less than or equal to the boundary speed separating the constant volts per Hertz region from the constant horsepower region, the VS signal is the integral of the inverter voltage when the integrated voltage reaches the proper volt second value, then the comparator 35 changes state to change the state of the signal to the cell fire table to sequence the cell table to the next step. In the constant horsepower region, VS is limited to a predetermined value. The output of divider circuit 35 is a signal $T_{INV}$ repesentative of times for an inverter state change. This $T_{INV}$ signal is coupled to a look-up table 39 which converts it to appropriate firing signal times and durations. The signals generated from the table 39 are coupled to a gate signal circuit 41 which provides appropriately sequenced firing signals to the individual components (SCR's) of the inverter 15.

For constant volt-second operation of motor 17, the frequency of the AC power applied to motor 17 is varied in response to the magnitude of the monitored link voltage $V_{INV}$. The graph 43 in processor block 19 indicates that for speeds less than or equal to the motor corner point, the VS* signal is constant. Thus, motor speed is controlled by variation in DC link voltage command V* which then effects a commanded frequency change. The graph 45 indicates that the V* signal varies linearly with speed command W* until the motor corner point (the constant horsepower region) is reached. At this point, V* is held constant and VS* is varied in an inverse relation.

In variable voltage AC motor systems of the type illustrated in FIG. 1, electrical braking presents difficulties in smoothly controlling the generation of power by the motor so that braking effort or reverse torque is uniform. In general, such systems require dynamic brake controls since the conversion of the power to a form acceptable by the AC power lines is usually not practical. Initially, the power (voltage) generated by the motor is greater than that required to be established on the DC link 13 so that the converter 11 is forced to an "off" mode. The magnitude of braking effort capable of being generated by motor 17 then becomes a function of the magnitude of energy which can be absorbed or dissipated at DC link 13. In general, one or more braking resistors are connected to the DC link by switches so that different values can be inserted to vary the power dissipation at the link. Prior art systems have provided either coarse control of braking resulting in "jerky" motor operation on have required very high frequency (compared to the motor propulsion control system frequency) in order to more uniformly control braking effort.

In the illustrative form of the present invention, a dynamic brake resistor 47 is coupled between the DC input terminals of inverter 15 by means of a conventional SCR chopper circuit 49. The chopper circuit 49 includes an SCR 51 serially connected with resistor 47 and a commutating SCR 53 for commutating SCR 51. A conventional gate control or firing circuit 55 provides gating signals to the gate control terminals of SCR's 51 and 53. The method and apparatus for providing signals to the circuit 55 in order to smoothly regulate the voltage on DC link 13 during dynamic braking is the essence of the present invention.

During motoring operation, the base execution rate of the converter 11 is digitally controlled and synchronized to the frequency of line voltage 13. In the preferred embodiment of the 60 hertz 6-pulse converter, every 2.77 milliseconds (ms), a timing pulse is coupled to firing circuit 29 in order to fire appropriate ones of each cell pair of SCRs in the converter. Preferably, the firing circuit 29 utilizes burst firing to assure that the selected SCR pair are gated into conduction. For this purpose, the microcomputer 19 generates a sequence of interrupt signals which cause the circuit 29 to generate firing signals.

Figure 2:
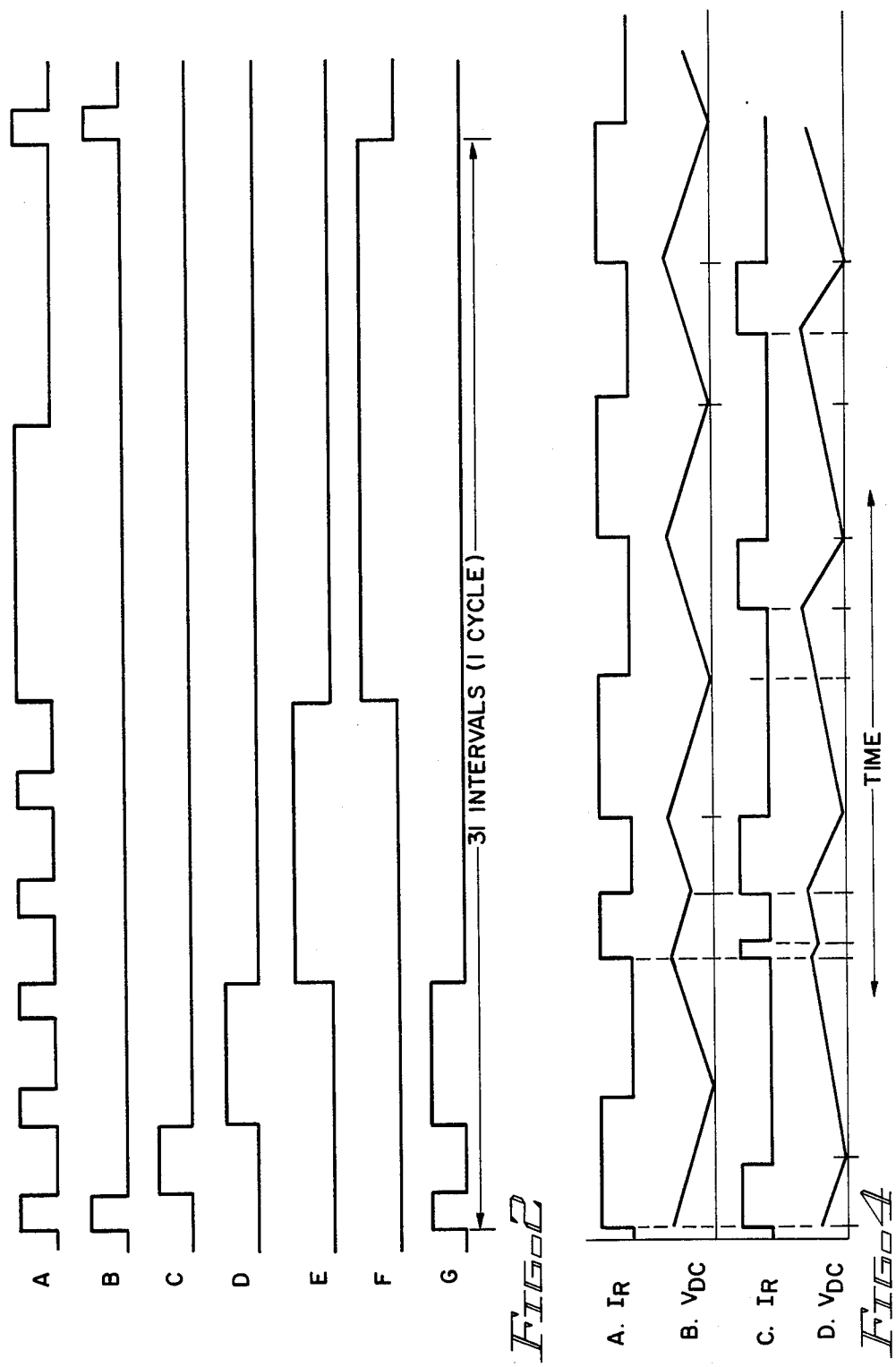
FIGS. 2(A–F) show a series of timing diagrams related to the binary weighting of the braking resistor.

Referring to FIG. 2, and in particular to FIG. 2A, there is illustrated a timing diagram showing the generation of a sequence of five burst firing signals followed by a computation time during each 2.77 ms cycle. During braking, the system utilizes these same timing signals to establish a binary weighted control of braking resistor 47 as a function of motor speed with the net result of holding motor torque constant and achieving smooth slow down, without high frequency control or multiple braking resistors.

FIGS. 2(A-F) depict clock timing sequences for forming binary current pulses from which 32 time-averaged effective resistances are developed. Utilizing the already existing timing control signals (interrupt signals) of the microcomputer 19, dynamic braking firing circuit 55 time ratio controls the SCR 51 to vary the effective resistance of braking resistor 47 during each period. In the preferred embodiment, the 2.77 ms cycle period is divided into 31 increments. The five SCR burst firings and the "next cell calculations" have been spaced within the 2.77 ms time window to allow utilization of their associated clock signals, FIG. 2A, for generating the binary weighted windows illustrated in FIGS. 2B through 2F. These FIGS. also illustrate that the binary weighted time intervals are sequentially occurring, binarially incrementing intervals, i.e., each interval is $2^N$ units in duration where N is an integer representing the selected interval and a "unit" is the integer representing the selected interval and a "unit" is the time duration of the smallest interval. For example, the smallest pulse, illustrated in FIG. 2B, lasts 1/31 of a cycle, beginning at T=0 and ending at T=1. Referring to FIG. 2C, the next pulse, being twice the duration of the smallest pulse, begins at T=1, the end of the first burst firing, and ends at T=3, the beginning of the second burst firing. The third pulse, shown in FIG. 2D, has a duration of 4/31 of a cycle. It begins at T=3 and ends at T=7. The fifth pulse, FIG. 2E, having a duration of 8/31 of a cycle, begins at T=7 and ends at T=16. The largest pulse, having a duration of 16/31, begins at T=16, the start of the "next cell calculations", and ends at T=31, the end of a cycle. While other binary subdivisions of wave form cycles are suitable for the purposes of this invention, the uniform step increase given by 31 effective values is of sufficient resolution to achieve the smooth control previously attained only with supplemental high frequency control. Because each binary period occurs during a different segment of the cycle, the resistance 47 may be switched into the circuit for any integer fraction of the cycle ranging from 1/31 to 31/31. As a further example, FIG. 2G illustrates a current pulse of 5/31 duration per cycle comprising a 1/31 pulse and a 4/31 pulse. During a cycle when the dynamic braking resistance 47 is not switched into the circuit, the effective resistance depends upon the ability of capacitor 33 to absorb energy. The lowest effective resistor is in the circuit for a full cycle or 2.77 ms.

The dynamic brake (DB) firing circuit 55 is of a type well known in the art for providing firing signals to SCR chopper control circuits. The firing circuit 55 is controlled or caused to generate gating signals to SCR 51 and commutation gating signals to SCR 53 by ON-/OFF command signals from a DB level to binary weighted time conversion circuit 57. The circuit 57 converts a dynamic braking effort command DB* to corresponding time weighted signals for firing circuit 55 in order to implement the binary weighted ON/OFF sequences described above. The implementation of circuit 57 can take several forms such as, for example, a look-up table which converts the DB* command value to corresponding time weighted signals.

The DB* command signal is generated as indicated by block 59 by the polarity and magnitude of the integrated error signal from control block 23. When VDC, the converter 11 output voltage, becomes greater than the commanded voltage V*, the error voltage Vc becomes negative and inhibits the production of firing pulses to converter 11. The block 59, however, responds to the negative error by producing a DB* command thus initiating dynamic braking.

While the overall control system for the converter 11 and inverter 15 has been described in terms of separate control blocks 21-27, 35-39 and 57-59, such blocks will be appreciated as being for purposes of explanation. The system as preferably implemented is an all-digital control system and the microcomputer 19 includes the capability of implementing in various associated memory units and software routines the functional blocks disclosed. Accordingly, the coupling of clock signals and interrupt signals between the various functional blocks has been omitted for clarity.

During braking, the inverter 15 operates in the same manner as in motoring. That is, the control blocks 19 and 35-39 are independent of motoring and braking. As the voltage VINV at the DC link varies, the inverter control blocks 35-39 continue to regulate the inverter to maintain the constant volts per hertz specified by the VS* signal regardless of whether the motor is accelerating or decelerating.

One benefit of binary weighting for these time slots is that there need be only five specific times (instead of 31) when calculation processing must be output to control the dynamic braking circuitry. This represents a tremendous reduction in execution loading for the digital processor that implements the inventive method. The specific times for dynamic braking on/off decisions are coordinated with other time-dependent functions being performed by the processor. The base period of the 31 part average is based on the main execution loops of the control processor. For a 60 Hz six-pulse converter, these are synchronized to the six firings of the converter, i.e., every 2.77 msec. The binary weighted times throughout this period are coordinated to times for burst firing of the conducting cells and a time for precalculating the next conducting cell pair. The relation between the binary weighted times and the other work being performed is arbitrary, but economics of execution loading can be achieved if the total number of separately-timed functions can be limited.

Figure 3:
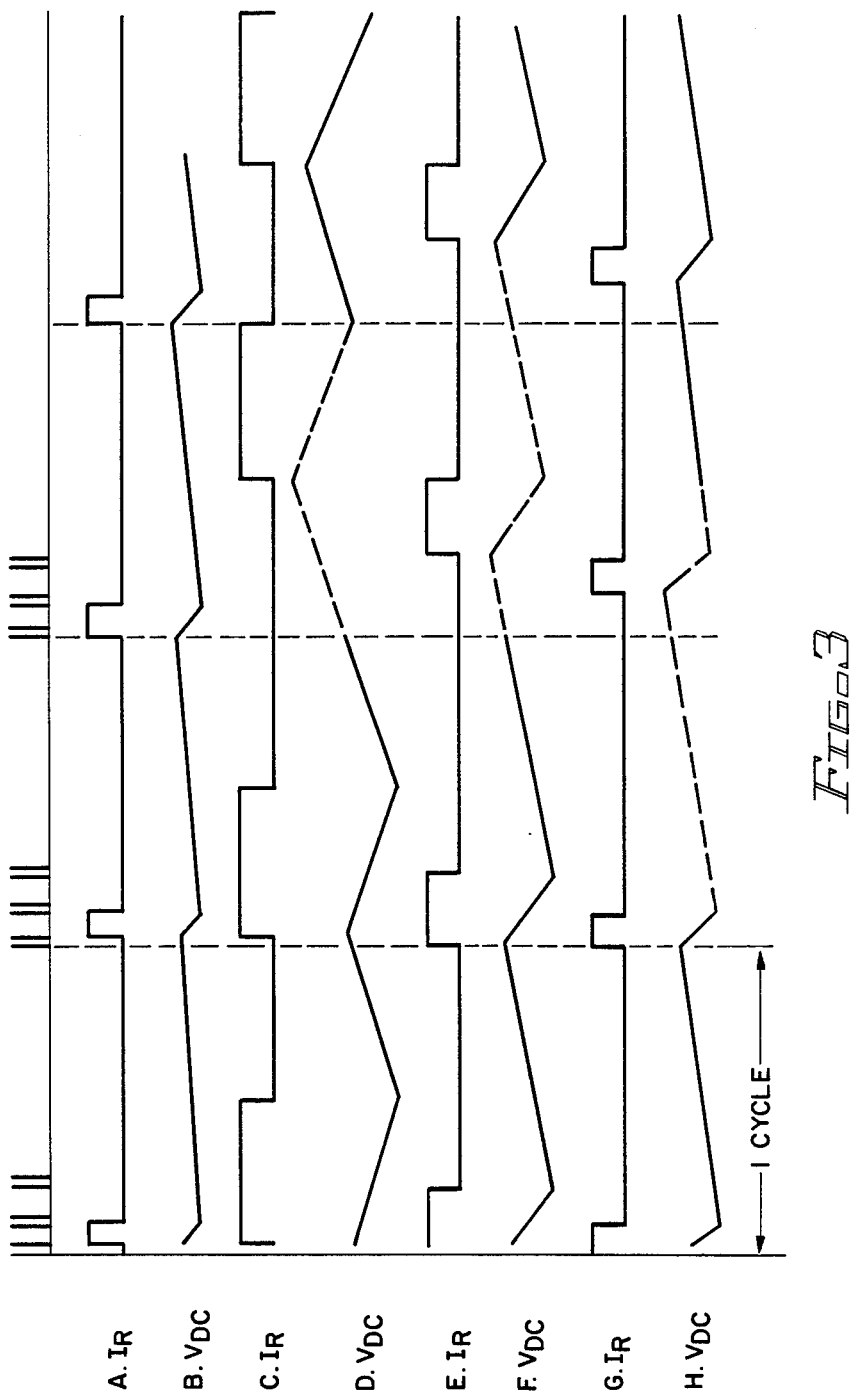
FIGS. 3(A–H) illustrate various phase relationships between adjacent cycles of link voltage as a function of current gate control.

As illustrated in FIG. 3 the DC link voltage VDC is 180° out of phase with the current IR through resistor 47. FIGS. 3A and 3B also illustrate a single step binary transition from a pulse duration of 2/31 to 3/31. Notwithstanding the increased on-time associated with this step transition, the phase of the ripple voltage between the two levels of resistance is approximately the same. As is apparent from FIG. 3B, the increased on-time of 1/31 cycle for current flow through braking resistor 37 results in a negligibly small voltage drop across the capacitor 33 between switching cycles. Comparable qualitative similarities also exist between other pairs of single step transitions with three exceptions. The transition between 15/31 and 16/31 resembles a 180° phase shift, FIGS. 3C and 3D. The transition between 7/31 and 8/31 resembles a 90° phase shift, FIGS. 3E and 3F. And the transition between 3/31 and 4/31 resembles a 45° phase shift, FIGS. 3G and 3H. These phase shift transition intervals occur due to the transition from front loading to back loading during successive cycles.

For example, as shown in FIG. 2, the time interval for 16/31 cycle occupies the second half of a cycle while 15/31 cycle is obtained during the first half cycle. During cycles of transition marked by these phase changes, the capacitor 33 experiences charging periods of greater duration than during other cycles. For example, the transition from front loading to back loading of current during a 2.77 ms cycle which occurs at the transition from 15/31 to 16/31 results in a charging time more than double the length experienced between non-transition cycles of either 15/31 or 16/31. In turn, this extended charging time results in up to a 15% ripple transient which can cause a noticeable change in motor torque. The transition from 7/31 to 8/31 is also measurably significant, but the smaller phase shift between 3/31 and 4/31 is not believed to significantly affect the torque. Consequently, a preferred embodiment of the inventive method incorporates additional resistance transitions intermediate to reaching both the 16/31 and the 8/31 steps in order to minimize the undesirable ripple transients. In particular, introducing a 23/31 resistance for one 2.77 ms cycle occurring between the 15/31 resistance and the 16/31 resistance results in the acceptably smooth transition exhibited in FIGS. 4A–4B. Similarly, the introduction of a 9/31 resistance for a 2.77 ms cycle occurring between the transition from 7/31 to 8/31 avoids the other troublesome phase shift and its associated voltage transient, FIG. 4C–D.

Transitioning down, i.e., effectively increasing resistance in order to allow higher motor speed, also can create resistance "bumps" in transitioning from 16/31 to 15/31 and 8/31 to 7/31. For the first case, i.e., 16/31 to 15/31, the transition is preferably from 16/31 to 8/31 for one cycle and then to 15/31. For the case of 8/31 to 7/31, the transition steps first from 8/31 to 6/31 and then to 7/31.

In summary, dynamic braking resistance is controlled by binary weighted gating of a time ratio control circuit to generate current flow during binary time windows within each of a predetermined cycle period. The on time varies in 1/31 increments of the period. The system monitors the generated DC voltage and increments the effective resistance in order to regulate the voltage, thus stabilizing the time averaged current flow during sequential cycle periods. The increments are 1/31 stepwise increases except for transitions between 15/31 and 16/31 and between 7/31 and 8/31 as discussed above.

The above described embodiments of the invention are illustrative only, and therefore modifications thereof may occur to those skilled in the art. Accordingly, this invention is not to be regarded as limited to the embodiments disclosed herein, but is to be interpreted in accordance with the appended claims.

What we claim as new and desire to secure by Letters Patent of the United States is:

1. A dynamic brake control system for an alternating current (AC) motor said system being supplied by AC power having a predetermined AC frequently, the motor being electrically connected to a variable voltage, variable frequency inverter for controlling the speed thereof, the inverter receiving direct current (DC) power via a DC link from an AC to DC converter of the type having a plurality of controllable switching devices, the switching devices being energized at a base execution rate which is synchronized to the AC frequency, the direction of current through the inverter being reversible in order to dissipate regenerated electric power by dynamic braking, said dynamic brake control system comprising:
    (a) resistive means switchably connected across the input terminals of the inverter for providing an effective dynamic braking resistance in order to dissipate regenerated current;
    (b) means for determining at the base execution rate a value of the effective dynamic braking resistance necessary to sustain a constant relation between voltage at the inverter input terminals and motor frequency during dynamic braking; and
    (c) control means for switchably connecting said resistive means to and disconnecting said resistive means from the inverter input terminals so that the effective dynamic braking resistance is adjustable at the base execution rate to values necessary to sustain a constant relation between voltage at the inverter input terminals and motor frequency during dynamic braking, said control means providing a plurality of binary time signals for establishing portions of the base execution period during which said resistive means is connected across the input terminals of the inverter.

2. A method for achieving smooth dynamic braking in an AC motor system comprising a computer controlled full-wave rectifier and chopper and a chopper control firing circuit for regulating an AC line voltage to a DC voltage at the input terminals of an inverter, the chopper and inverter being energized at a base execution rate which is synchronized to the AC line voltage frequency, the direction of current through the inverter being reversible in order to dissipate regenerated electric power in a braking resistance, the method comprising the step of:
    providing an energy absorbing resistance;
    coupling the resistance in circuit with a controllable switching means to the input terminals of the inverter;
    generating switching signals during each cycle of the AC line voltage, the switching signals being generated at intervals corresponding to a binary weighted division of each cycle; and
    selectively applying the switching signals to the switching means for switching the resistance in and out of circuit with the inverter in a manner to maintain the DC voltage at a predetermined value.

3. The method of claim 2 wherein the binary weighted time intervals are sequentially occurring, binarially incrementing intervals and including the step of increasing the effective resistance by switching the resistance into circuit with the inverter by stepwise binarially incremented intervals.

4. The method of claim 3 and including the step of switching the resistance into circuit with the inverter for an intermediate transition time interval during at least one cycle before switching between phase shifted transition time intervals in order to reduce ripple currents.

5. A control system for an alternating current (AC) motor comprising:
    a converter for converting AC power having a predetermined AC frequency to direct (DC) power;
    a DC link for receiving the DC power;
    an inverter connected to the DC link for converting DC power to variable voltage, variable frequency power for application to the motor, said inverter being operable to transfer regenerated power from the motor to the DC link resistive means;

time ratio control means connected in circuit with said resistive means and arranged to selectively couple said resistive means to said DC link for varying the effective resistance thereof;

control means responsive to a motor speed command for selectively energizing said converter in synchronism with the AC power for establishing a selected voltage on said DC link, said control means further controlling said inverter to vary the frequency of excitation applied to the motor in a manner to force the motor to the commanded speed and being operative to control said inverter in a manner to transfer power from the motor to said DC link when motor speed exceeds the commanded speed; and means operatively connected in circuit with said control means and responsive to the voltage on said DC link exceeding the selected voltage for energizing said time ratio control means for selectively coupling said resistive means to said link in a manner to minimize any difference between said link voltage and said selected voltage, said time ratio control means being energized in synchronism with the AC frequency such that said resistive means is coupled to said DC link for time periods during each cycle of the AC frequency which are binary weighted time segments of each cycle.

* * * * *